*(12)* United States Patent
Fan et al.

(10) Patent No.: US 11,960,689 B2
(45) Date of Patent: Apr. 16, 2024

(54) TOUCH-CONTROL DISPLAY PANEL AND PREPARATION METHOD THEREFOR, AND TOUCH-CONTROL DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Cong Fan, Beijing (CN); Fan He, Beijing (CN); Kemeng Tong, Beijing (CN); Xiangdan Dong, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 90 days.

(21) Appl. No.: 17/629,793

(22) PCT Filed: Apr. 30, 2021

(86) PCT No.: PCT/CN2021/091745
§ 371 (c)(1),
(2) Date: Jan. 25, 2022

(87) PCT Pub. No.: WO2021/244202
PCT Pub. Date: Dec. 9, 2021

(65) Prior Publication Data
US 2022/0253177 A1    Aug. 11, 2022

(30) Foreign Application Priority Data

Jun. 2, 2020    (CN) .......................... 202010488947.7

(51) Int. Cl.
*G06F 3/044*    (2006.01)

(52) U.S. Cl.
CPC .......... *G06F 3/0445* (2019.05); *G06F 3/0446* (2019.05); *G06F 3/0448* (2019.05);
(Continued)

(58) Field of Classification Search
CPC ..... G06F 3/0445; G06F 3/0446; G06F 3/0448
(Continued)

(56) References Cited

U.S. PATENT DOCUMENTS

| 2017/0090636 A1* | 3/2017 | Ding ...................... G06F 3/0445 |
| 2018/0253175 A1* | 9/2018 | Yao ....................... G06F 3/0445 |
| 2019/0079626 A1* | 3/2019 | Liu .................... H01L 29/78675 |
| 2021/0257389 A1* | 8/2021 | Zhang ................. G02F 1/13629 |
| 2021/0397320 A1* | 12/2021 | Ye .......................... G06F 3/0448 |

FOREIGN PATENT DOCUMENTS

| CN | 208141357 U | 11/2018 |
| CN | 109064897 A | 12/2018 |

(Continued)

OTHER PUBLICATIONS

Fan Yanyun; A touch display panel and a touch display device; Apr. 16, 2019; Xiamen Tianma Micro Electronics Co Ltd CN109634471A; paragraphs 0038-0044; figures 5 and 7 English.*

(Continued)

*Primary Examiner* — Prabodh M Dharia
(74) *Attorney, Agent, or Firm* — Ling Wu; Stephen Yang; Ling and Yang Intellectual Property (57) ABSTRACT

A touch-control display panel and a preparation method therefor, and a touch-control display apparatus. The touch-control display panel includes a substrate, a first metal layer provided on the substrate, an insulating layer provided at the side of the first metal layer away from the substrate, and a second metal layer provided at the side of the insulating layer away from the first metal layer, one of the first metal layer and the second metal layer comprises a plurality of connection bridges, and the other one comprises a first electrode, a second electrode and a through hole; at least one (Continued)

of the first metal layer and the second metal layer further comprises compensation electrodes surrounding the through hole; and the compensation electrodes comprise a first compensation electrode and a second compensation electrode, the surface of the first compensation electrode adjacent to the second compensation electrode is a first end face.

16 Claims, 5 Drawing Sheets

(52) U.S. Cl.
CPC .............. *G06F 2203/04103* (2013.01); *G06F 2203/04111* (2013.01)

(58) Field of Classification Search
USPC ........................................................ 345/174
See application file for complete search history.

(56) References Cited

FOREIGN PATENT DOCUMENTS

| | | |
|---|---|---|
| CN | 109634471 A | 4/2019 |
| CN | 110837314 A | 2/2020 |
| CN | 111538443 A | 8/2020 |

OTHER PUBLICATIONS

Fan Yanyun; A touch display panel and a touch display device; Apr. 16, 2019; Xiamen Tianma Micro Electronics Co Ltd CN109634471A; paragraphs 0038-0044; figures 5 and 7 Chinese.*
International Search Report for PCT/CN2021/091745 dated Jul. 1, 2021.

* cited by examiner

TOUCH-CONTROL DISPLAY PANEL AND PREPARATION METHOD THEREFOR, AND TOUCH-CONTROL DISPLAY APPARATUS

CROSS-REFERENCE TO RELATED APPLICATIONS

The present application is a U.S. National Phase Entry of International Application PCT/CN2021/091745 having an international filing date of Apr. 30, 2021, which claims priority of Chinese Patent Application No. 202010488947.7, filed to the CNIPA on Jun. 2, 2020 and entitled "Touch-Control Display Panel and Preparation Method Therefor, and Touch-Control Display Apparatus," the contents of which should be construed as being incorporated herein by reference.

TECHNICAL FIELD

Embodiments of the present disclosure relate to, but are not limited to, the field of display technology, and particularly relate to a touch display panel and a method for preparing the touch display panel, and a touch display apparatus.

BACKGROUND

With rapid development of display technologies, touch technologies have been applied to various electronic devices and various fields, and are increasingly popular among a wide variety of users. Touch panels may be divided into types of capacitive, resistive, infrared, surface acoustic wave, electromagnetic, vibration wave induction and frustrated total internal reflection optical sensor, etc. according to operation principles. Based on a unique touch principle, capacitive touch screens are widely used in various electronic interactive scene devices due to advantages such as high sensitivity, long service life, and high light transmittance.

In order to achieve a larger screen ratio, an in-screen punch-hole technology is used in some display panels, that is, a punch-hole region for placing hardware such as a front camera is disposed in an active area. However, for a display panel with integrated touch function, this technology undermines uniformity of touch performance in an entire active area and reduces touch performance.

SUMMARY

The following is a summary of subject matters described in the present disclosure in detail. The summary is not intended to limit the scope of protection of the claims.

An embodiment of the present disclosure provides a touch display panel, which includes a substrate, a first metal layer disposed on the substrate, an insulating layer disposed at a side of the first metal layer away from the substrate, and a second metal layer disposed at a side of the insulating layer away from the first metal layer, wherein: one of the first metal layer and the second metal layer includes multiple connection bridges, and the other of the first metal layer and the second metal layer includes a first electrode, a second electrode and a through via, the first electrode includes multiple first sub-electrodes arranged along a first direction, and adjacent first sub-electrodes are bridged by a connection bridge; the second electrode includes multiple second sub-electrodes arranged along a second direction, and two adjacent second sub-electrodes along the second direction are connected with each other; the through via penetrates through the first sub-electrodes and the second sub-electrodes; and at least one of the first metal layer and the second metal layer further includes a compensation electrode surrounding the through via, wherein the compensation electrode includes a first compensation electrode and a second compensation electrode; a surface of the first compensation electrode adjacent to the second compensation electrode is a first end face; a surface of the second compensation electrode adjacent to the first compensation electrode is a second end face; a structure of the first end face is complementary to a structure of the second end face; and a length of an outer contour of the first end face is greater than a thickness of the first compensation electrode along a centerline direction of the through via.

In some possible implementations, arrangement positions of the first compensation electrode and the second compensation electrode includes at least one of:
the first compensation electrode and the second compensation electrode are both disposed on the first metal layer;
the first compensation electrode and the second compensation electrode are both disposed on the second metal layer; and
one of the first compensation electrode and the second compensation electrode is disposed on the first metal layer, and the other of the first compensation electrode and the second compensation electrode is disposed on the second metal layer.

In some possible implementations, the first end face and the second end face are curved surfaces or slope surfaces.

In some possible implementations, the first end face includes one or more first protrusions and one or more first spacers, and the second end face includes one or more second protrusions and one or more second spacers, wherein the first protrusions are located in the second spacers and the second protrusions are located in the first spacers.

In some possible implementations, the first end surface includes one or more first protrusions, and the second end surface includes one or more second protrusions, and the first protrusions and the second protrusions are arranged at intervals.

In some possible implementations, the first compensation electrode includes N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

In some possible implementations, the second compensation electrode includes n second compensation sub-electrodes, wherein m second compensation sub-electrodes are connected with the second sub-electrodes, and (n−m) second compensation sub-electrodes are insulated from the first sub-electrodes and the second sub-electrodes, where m is a natural number smaller than or equal to n and n is a natural number greater than 1.

An embodiment of the present disclosure further provides a touch display apparatus, including the touch display panel as described above.

An embodiment of the present disclosure further provides a method for preparing a touch display panel, which includes: forming a first metal layer on a substrate; forming an insulating layer at a side of the first metal layer away from the substrate; forming a second metal layer at a side of the insulating layer away from the first metal layer, wherein one of the first metal layer and the second metal layer includes multiple connection bridges, and the other of the first metal layer and the second metal layer includes a first electrode, a second electrode and a through via, the first electrode includes multiple first sub-electrodes arranged along a first direction, and adjacent first sub-electrodes are bridged by a connection bridge; the second electrode includes multiple second sub-electrodes arranged along a second direction, and two adjacent second sub-electrodes along the second direction are connected with each other; at least one of the first metal layer and the second metal layer further includes a compensation electrode surrounding the through via, the compensation electrode includes a first compensation electrode and a second compensation electrode; a surface of the first compensation electrode adjacent to the second compensation electrode is a first end face; a surface of the second compensation electrode adjacent to the first compensation electrode is a second end face; a structure of the first end face is complementary to a structure of the second end face; and a length of an outer contour of the first end face is greater than a thickness of the first compensation electrode along a centerline direction of the through via.

In some possible implementations, arrangement positions of the first compensation electrode and the second compensation electrode includes any one of:

the first compensation electrode and the second compensation electrode are both disposed on the first metal layer;

the first compensation electrode and the second compensation electrode are both disposed on the second metal layer; and one of the first compensation electrode and the second compensation electrode is disposed on the first metal layer, and the other of the first compensation electrode and the second compensation electrode is disposed on the second metal layer.

Other aspects may be understood upon reading and understanding of the drawings and the detailed description.

BRIEF DESCRIPTION OF DRAWINGS

Accompanying drawings are used to provide an understanding of technical solutions of the present disclosure, form a part of the specification, and are used to explain the technical solutions of the present disclosure together with the embodiments of the present disclosure and are not intended to form limitations on the technical solutions of the present disclosure.

DETAILED DESCRIPTION

In order to make objects, technical solutions and advantages of the present disclosure more clear, embodiments of the present disclosure will be described in detail below with reference to the drawings. The embodiments in the present disclosure and the features in the embodiments may be freely combined if there is no conflict.

Figure 1:
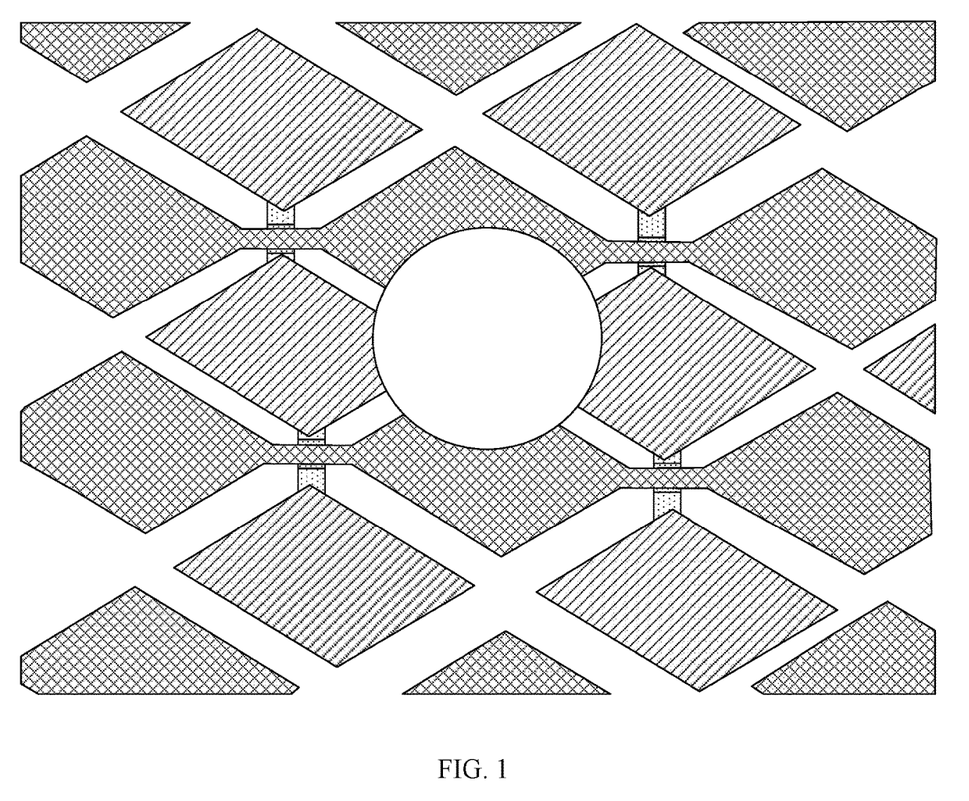
FIG. 1 is a schematic diagram of a structure of a touch display panel in some technologies.

In practical application processes, in order to pursue a larger area of the active area and reduce bezels, some terminal manufacturers have begun to dispose mounting holes for reserving mounting positions of hardware such as front cameras, in an Active Area (AA) on a display panel. However, as shown in FIG. 1, this design makes a completeness of a touch sensor in a mounting hole region of the active area seriously damaged, which leads to a large difference between electrical parameters of an incomplete touch sensor at this position, such as inductive capacitance, and those of complete touch sensors at other positions in the active area, thus damaging uniformity of touch performance of the entire active area.

Although a touch integrated circuit (IC) may make some algorithmic compensation for some touch sensors whose completeness is slightly damaged, such compensation is achieved on the basis of sacrificing other performance (such as power consumption, etc.) of the touch IC, and its algorithmic compensation is also limited. Because of serious lack of sensor units in the mounting hole region of the active area, it is almost impossible to achieve uniformity of the touch performance between the sensor units in the mounting hole region of the active area and complete sensor units in other touch areas.

Embodiments of the present disclosure provide a touch display panel, a method for preparing the touch display panel and a touch display apparatus, which can improve the uniformity of the touch performance of the entire active area. By arrangement of a compensation electrode and adjustment of an end face structure of the compensation electrode, parameters such as mutual capacitance induction (Delta Cm) of touch sensors in the mounting hole region of the active area may be adjusted, so that touch electrical parameters of an incomplete sensor unit in the mounting hole region of the active area tend to be barely different from those of a complete sensor unit, thus ensuring the uniformity of the touch performance of the entire touch display panel.

An embodiment of the present disclosure provides a touch display panel, which includes a substrate, a first metal layer disposed on the substrate, an insulating layer disposed at a side of the first metal layer away from the substrate, and a second metal layer disposed at a side of the insulating layer away from the first metal layer. One of the first metal layer and the second metal layer includes multiple connection bridges, and the other of the first metal layer and the second metal layer includes a first electrode, a second electrode and a through via. The first electrode and the second electrode are disposed to intersect with each other. The first electrode includes multiple first sub-electrodes arranged along a first direction, wherein adjacent first sub-electrodes are bridged by connection bridges. The second electrode includes multiple second sub-electrodes arranged along a second direction, wherein two adjacent second sub-electrodes along the second direction are connected with each other. The through via penetrates the first sub-electrodes and the second sub-electrodes. At least one of the first metal layer and the second metal layer further includes a compensation electrode surrounding the through via, wherein the compensation electrode includes a first compensation electrode and a second compensation electrode. A surface of the first compensation electrode adjacent to the second compensation electrode is a first end face, a surface of the second compensation electrode adjacent to the first compensation electrode is a second end face, and a structure of the first end face is complementary to a structure of the second end face, wherein a length of an outer contour of the first end face or the second end face is greater than a thickness of the first compensation electrode or the second compensation electrode along a centerline direction of the through via.

In the touch display panel according to the embodiment of the present disclosure, the first compensation electrode and the second compensation electrode are disposed around the through via, the structure of the first end face of the first compensation electrode (that is, the surface of the first compensation electrode adjacent to the second compensation electrode) is complementary to the structure of the second end face of the second compensation electrode (that is, the surface of the second compensation electrode adjacent to the first compensation electrode), and the length of the outer contour of the first end face or the second end face is greater than the thickness of the first compensation electrode or the second compensation electrode along the centerline direction of the through via, so that a mutual induction area of an incomplete touch sensor is increased, induction capacitance at the incomplete touch sensor is improved, and the uniformity of the touch performance of the entire active area is improved.

Figure 2:
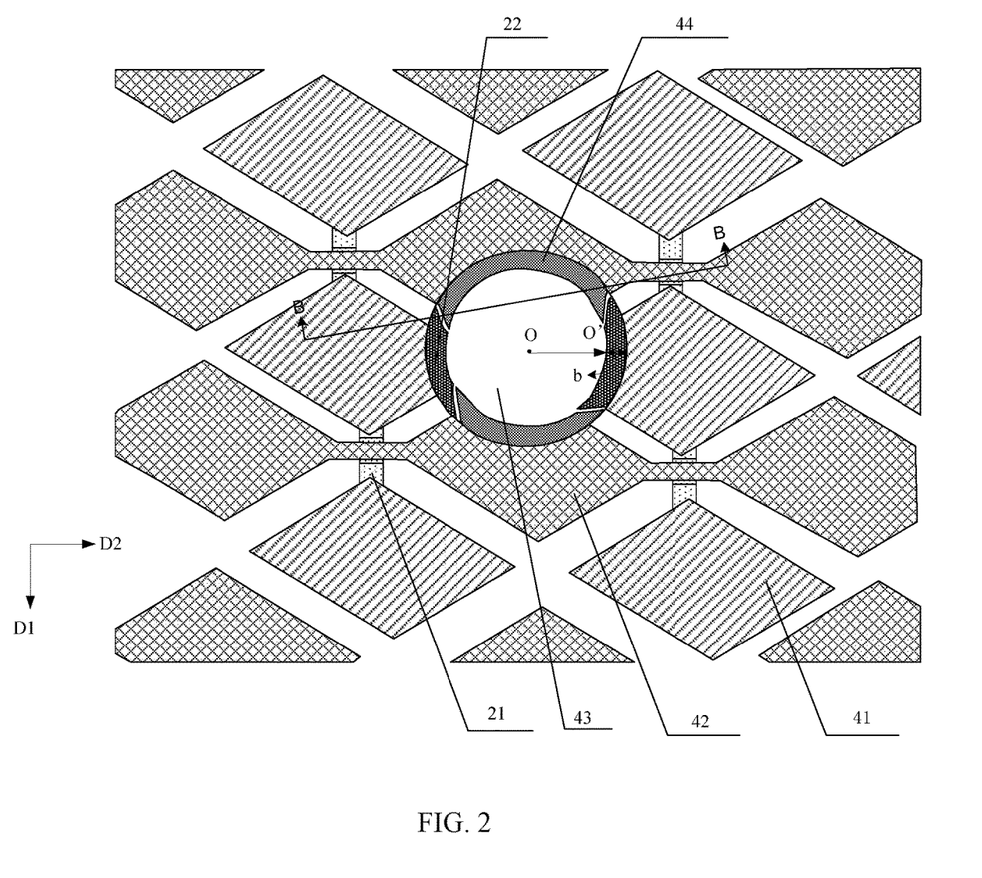
FIG. 2 is a schematic diagram of a structure of a touch display panel according to an embodiment of the present disclosure.

FIG. 2 is a schematic diagram of a structure of a touch display panel according to an embodiment of the present disclosure. As shown in FIG. 2, the touch display panel of this embodiment includes a substrate 10, a first metal layer disposed on the substrate 10, an insulating layer 30 disposed at a side of the first metal layer away from the substrate 10, and a second metal layer disposed at a side of the insulating layer 30 away from the first metal layer.

Among them, one of the first metal layer and the second metal layer includes multiple connection bridges 21, and the other of the first metal layer and the second metal layer includes a first electrode 41, a second electrode 42 and a through via 43. The first electrode 41 and the second electrode 42 are disposed to intersect with each other. The first electrode 41 includes multiple first sub-electrodes arranged along a first direction D1, wherein adjacent first sub-electrodes are bridged by connection bridges 21. The second electrode 42 includes multiple second sub-electrodes arranged along a second direction D2, and two adjacent second sub-electrodes along the second direction D2 are connected with each other. The through via 43 penetrates the first sub-electrodes and the second sub-electrodes.

At least one of the first metal layer and the second metal layer further includes a compensation electrode surrounding the through via 43. The compensation electrode includes a first compensation electrode 22 and a second compensation electrode 44. A surface of the first compensation electrode 22 adjacent to the second compensation electrode 44 is a first end face, and a surface of the second compensation electrode 44 adjacent to the first compensation electrode 22 is a second end face. A structure of the first end face is complementary to a structure of the second end face, wherein a length of an outer contour of the first end face or the second end face is greater than a thickness b of the first compensation electrode 22 or the second compensation electrode 44 along a centerline direction OO' of the through via.

In an exemplary embodiment, the first end surface or the second end surface may be a curved surface or a slope surface.

In an exemplary embodiment, the first compensation electrode 22 and the second compensation electrode 44 may both be disposed on the first metal layer, or may both be disposed on the second metal layer.

Figure 3:
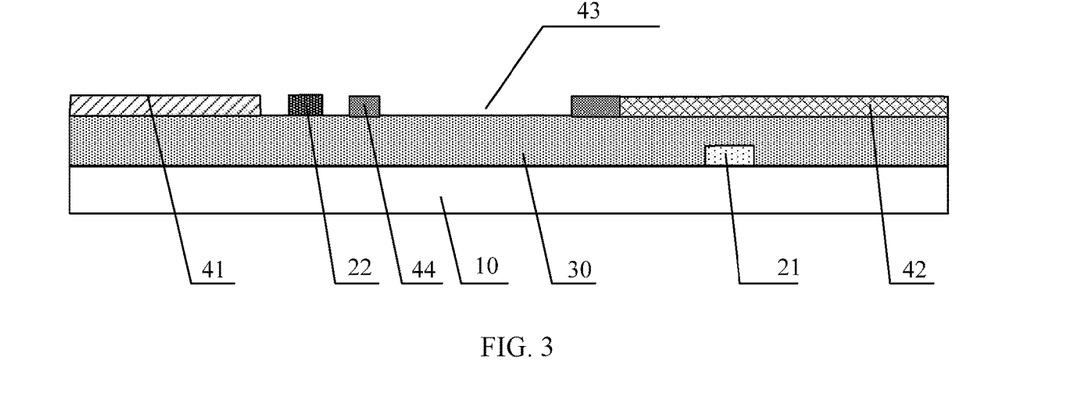
FIG. 3 is a schematic diagram of a sectional structure of a touch display panel in FIG. 2 along BB direction.

For example, as shown in FIG. 2 and FIG. 3, the first end face and the second end face are both slope surfaces, and the first compensation electrode 22 and the second compensation electrode 44 are both disposed on the second metal layer.

In an exemplary embodiment, the first end face includes one or more first protrusions and one or more first spacers, and the second end face includes one or more second protrusions and one or more second spacers, wherein the first protrusions are located in the second spacers and the second protrusions are located in the first spacers.

In a case that the first compensation electrode 22 and the second compensation electrode 44 are disposed on a metal layer, a certain interval should be maintained between the first end face and the second end face to prevent short circuit between the first electrode and the second electrode.

In another exemplary embodiment, one of the first compensation electrode 22 and the second compensation electrode 44 is disposed on the first metal layer and the other of the first compensation electrode 22 and the second compensation electrode 44 is disposed on the second metal layer.

Figure 4:
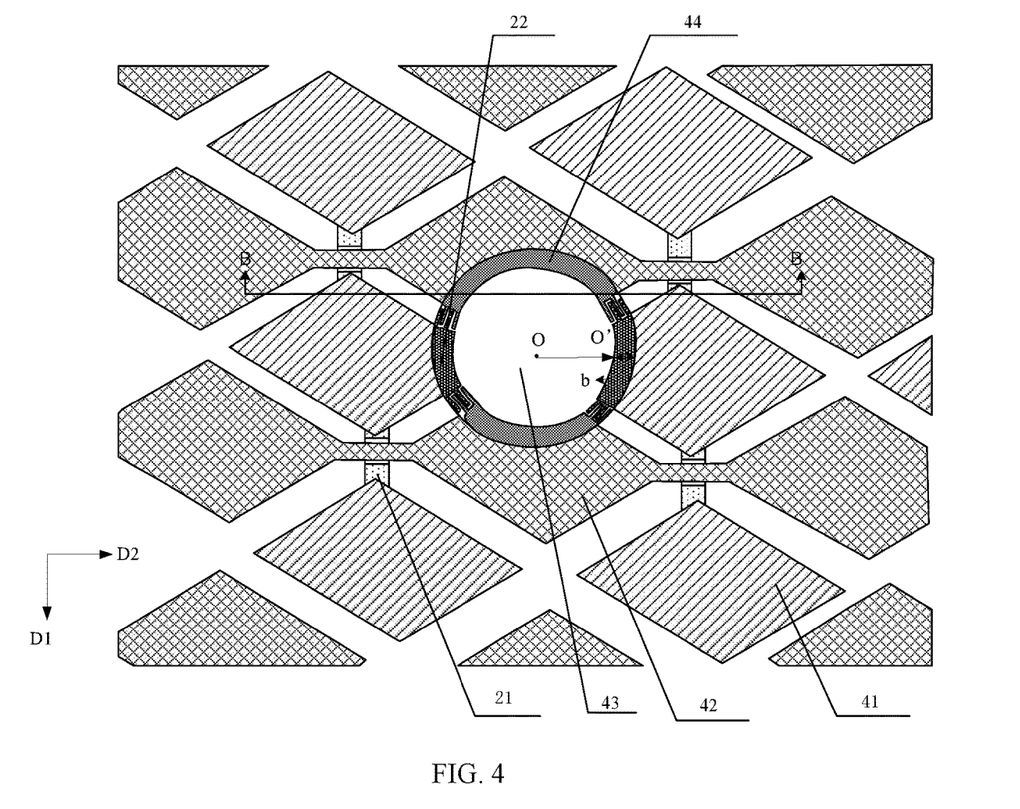
FIG. 4 is a schematic diagram of a structure of another touch display panel according to an embodiment of the present disclosure.
Figure 5:
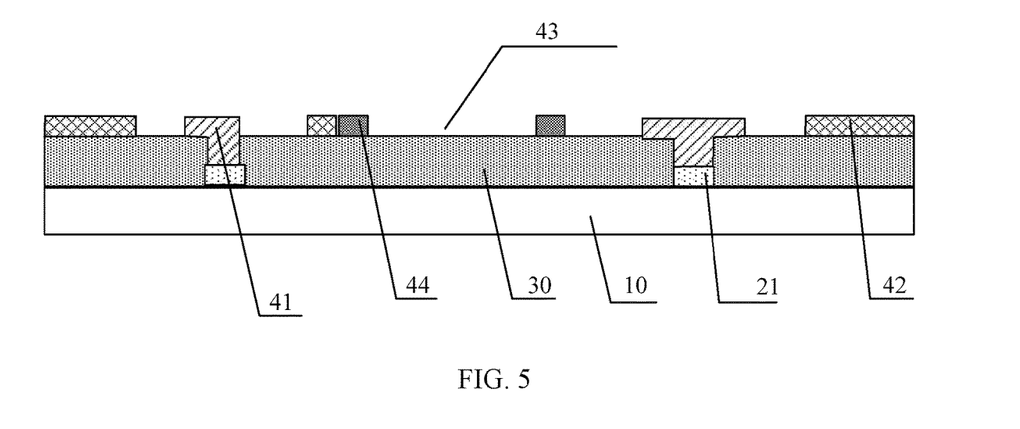
FIG. 5 is a schematic diagram of a sectional structure of the touch display panel in FIG. 4 along BB direction.

For example, as shown in FIG. 4 and FIG. 5, the first end face and the second end face are both curved surfaces, and the first compensation electrode 22 and the second compensation electrode 44 are both disposed on the second metal layer.

In an exemplary embodiment, the first end face includes one or more first protrusions, and the second end face includes one or more second protrusions, wherein the first protrusions and the second protrusions are arranged at intervals.

In an exemplary embodiment, there is an overlap region between an orthographic projection of the first protrusions on the substrate and an orthographic projection of the second compensation electrode on the substrate. There is an overlap region between an orthographic projection of the second protrusions on the substrate and an orthographic projection of the first compensation electrode on the substrate.

Figure 6:
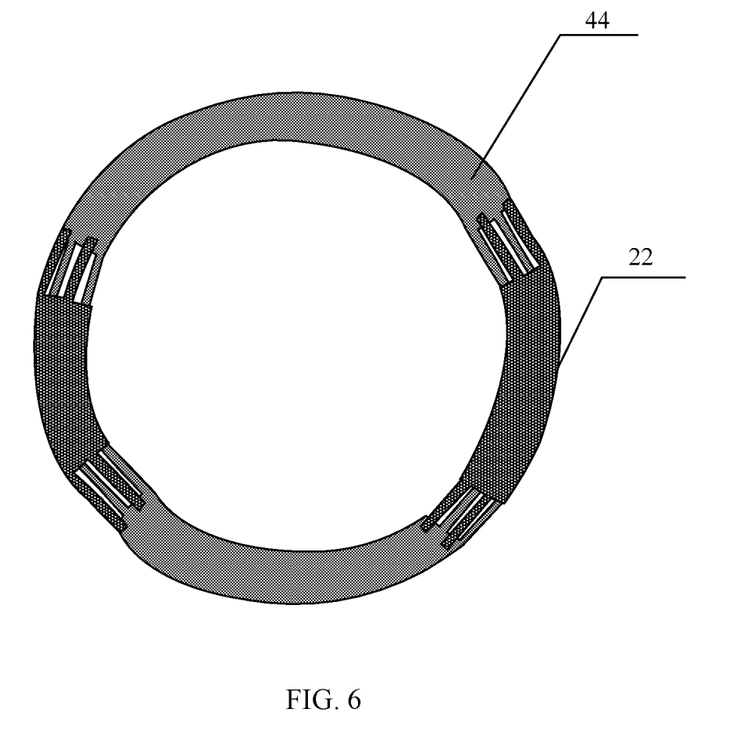
FIG. 6 is a schematic diagram of a structure of a compensation electrode according to an embodiment of the present disclosure.

In a case that the first compensation electrode 22 and the second compensation electrode 44 are disposed on different metal layers, as shown in FIG. 6, an interval between the first end face and the second end face may be set to any small value, or there may be overlapping between the first end face and the second compensation electrode or between the first compensation electrode and the second end face, thus further increasing the mutual induction area between the first electrode and the second electrode, improving the induction capacitance at an incomplete touch sensor and improving the uniformity of the touch performance of the entire active area.

Simulation results show that by use of an overlapping structure between the first compensation electrode and the second compensation electrode as shown in FIG. 6, a Delta Cm parameter value of an incomplete touch sensor reaches 98.6% of that of a complete touch sensor, which is barely different with that of a complete touch sensor, and the compensation effect is significantly improved. Furthermore, an overlapping area between the first end face and the second compensation electrode, and that between the first compensation electrode and the second end face are further adjusted, thus the Delta Cm parameter of the compensated incomplete touch sensor can reach 100% of the Delta Cm parameter of the complete touch sensor or even exceed the Delta Cm parameter of the complete touch sensor. The embodiment of the present disclosure not only achieves touchability of a mounting hole region of the active area, but also significantly improves the uniformity of the touch performance of the entire active area.

In an exemplary embodiment, the first compensation electrode 22 may include N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

In an exemplary embodiment, the second compensation electrode 44 may include n second compensation sub-electrodes, wherein m second compensation sub-electrodes are connected with the second sub-electrodes, and (n−m) second compensation sub-electrodes are insulated from the first sub-electrodes and the second sub-electrodes, where m is a natural number smaller than or equal to n and n is a natural number greater than 1.

According to the touch display panel of the embodiment of the present disclosure, some first compensation sub-electrodes or some second compensation sub-electrodes are disposed in a suspended manner (that is, insulated from the first sub-electrodes and the second sub-electrodes), so that an increased self-capacitance value generated between the compensation sub-electrodes and cathodes of the display panel can be reduced, and the display quality of the display panel can be improved.

In an exemplary embodiment, a shape of a first compensation electrode 22 is a circular arc structure, and a shape of a second compensation electrode 44 is a circular arc structure. Centers of a circle where the circular arc of the first compensation electrode 22 is located, a circle where the circular arc of the second compensation electrode 44 is located, and a circle where the through via is located coincide with each other.

In an exemplary embodiment, a diameter of the circle where the circular arc of the first compensation electrode 22 is located may be or not be equal to a diameter of the circle where the circular arc of the second compensation electrode 44 is located, which is not limited in the present disclosure.

The technical solution of the embodiment of the present disclosure is further described below by a preparation process of a touch display panel according to an embodiment of the present disclosure. A "patterning process" mentioned in an embodiment of the present disclosure includes processes such as film layer deposition, photoresist coating, mask exposure, development, etching, and photoresist stripping, etc. A "photoetching process" mentioned in an embodiment of the present disclosure includes processes such as film layer coating, mask exposure, and development, etc. Processes such as sputtering, chemical vapor deposition may be used for the deposition.

(1) A drive structure layer, a planarization layer, an anode, an organic light-emitting layer and a cathode are sequentially formed on an underlay substrate, and an encapsulation layer is formed at a side of the cathode away from the underlay substrate to obtain the substrate 10.

The drive structure layer may include multiple gate lines and multiple data lines, wherein the multiple gate lines and the multiple data lines may cross vertically to define multiple pixel units arranged in a matrix. Each pixel unit includes at least three sub-pixels, and each sub-pixel includes one or more Thin Film Transistors (TFTs). In this embodiment, one pixel unit may include three sub-pixels, which are respectively a red sub-pixel R, a green sub-pixel G, and a blue sub-pixel B. Of course, the solution of this embodiment is also applicable to a case where a pixel unit includes four sub-pixels (a red sub-pixel R, a green sub-pixel G, a blue sub-pixel B and a white sub-pixel W). In this embodiment, a preparation process of the drive structure layer may include: cleaning the underlay substrate first, then preparing an active layer on the underlay substrate by a patterning process, then forming a first insulating layer covering the active layer, forming the gate lines and gate electrodes on the first insulating layer, then forming a second insulating layer covering the gate lines and the gate electrodes, and forming data lines, source electrodes and drain electrodes on the second insulating layer. Each thin film transistor may have a bottom gate structure, a top gate structure, it may be an amorphous silicon (a-Si) thin film transistor, a low temperature polysilicon (LTPS) thin film transistor or an oxide thin film transistor.

An anode of each sub-pixel is connected with a drain electrode of a thin film transistor in the sub-pixel through a via on the planarization layer. The organic light-emitting layer may include a hole injection layer (HIL), a hole transport layer (HTL), a light-emitting layer (EML), an electron transport layer (ETL) and an electron injection layer (EIL) which are stacked. Among them, the hole transport layer (HTL), the light-emitting layer (EML), the electron transport layer (ETL) and the electron injection layer (EIL) are sequentially disposed on the hole injection layer. The organic light-emitting layer is formed in a pixel opening region, to achieve connection between the organic light-emitting layer and the anode.

The encapsulation layer may serve a function of blocking water and oxygen, and prevent external water vapor from eroding the organic light-emitting layer (thus affecting the performance of the touch display panel). The encapsulation layer may have a laminated structure of inorganic material/organic material/inorganic material, and the organic material layer is disposed between two inorganic material layers.

Figure 7:
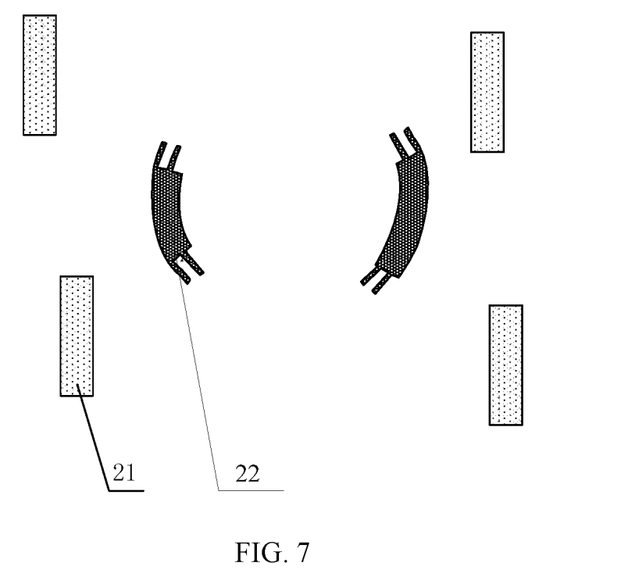
FIG. 7 is a schematic diagram of a substrate after a pattern of a first metal layer is formed according to an embodiment of the present disclosure.

(2) A pattern of the first metal layer is formed on a surface of the encapsulation layer away from the underlay substrate. As shown in FIG. 7, the first metal layer may include multiple connection bridges 21 and first compensation electrodes 22 disposed at intervals. The connection bridges 21 are located in a region where a touch sensor is to be formed, and the first compensation electrodes 22 are located in an edge region of a through via 43 is to be formed. Formation of the pattern of the first metal layer includes: depositing a conductive thin film on the substrate 10, coating a layer of photoresist on the conductive thin film, exposing and developing the photoresist by using a mask plate, forming an unexposed region at a pattern position of a bridge layer, retaining the photoresist, forming a fully exposed region at other positions, removing the photoresist, etching the conductive thin film in the fully exposed region and stripping the remaining photoresist, and forming the pattern of the first metal layer on the substrate 10. The conductive thin film may be made of a metal material or a transparent conductive material, such as indium tin oxide (ITO), indium zinc oxide (IZO), carbon nanotubes or graphene, etc.

Figure 8:
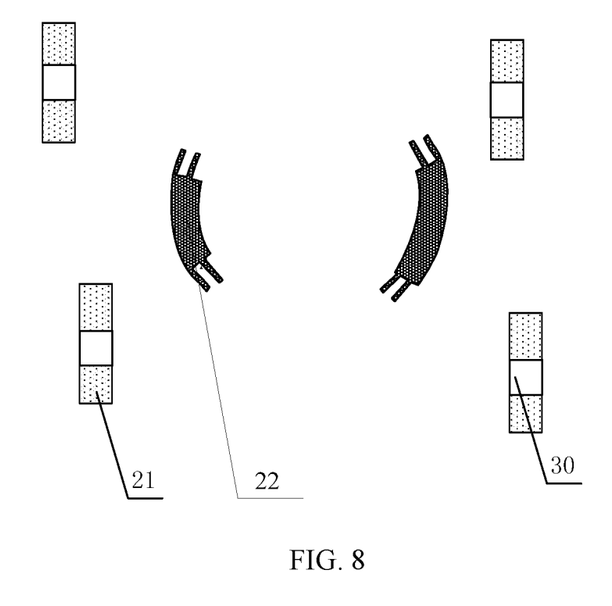
FIG. 8 is a schematic diagram of a substrate after a pattern of an insulating layer is formed according to an embodiment of the present disclosure.

(3) A pattern of the insulating layer 30 is formed on a surface at a side of the first metal layer on away from the underlay substrate. As shown in FIG. 8, the insulating layer 30 includes multiple vias which are disposed at two ends of the connection bridge 21. The insulating layer may be made of a transparent material, so that the touch panel may be used for an integrated touch display panel.

(4) A pattern of the second metal layer is formed on a surface of the insulating layer 30 away from the underlay substrate. As shown in FIG. 4, the second metal layer may include patterns of a first electrode 41, a second electrode 42, a through via 43 and a second compensation electrode 44. The first electrode 41 includes multiple first sub-electrodes arranged along a first direction D1, wherein two adjacent first sub-electrodes along the first direction D1 are electrically connected with one connection bridge 21 through vias. The second electrode 42 includes multiple second sub-electrodes arranged along a second direction, wherein two adjacent second sub-electrodes along the second direction D2 are connected with each other, and the first direction D1 and the second direction D2 intersect with each other. The through via 43 penetrates the first sub-electrodes and the second sub-electrodes. The second compensation electrode 44 is located in an edge region of the through via 43, a surface of the first compensation electrode 22 adjacent to the second compensation electrode 44 is a first end face, and a surface of the second compensation electrode 44 adjacent to the first compensation electrode 22 is a second end face. A structure of the first end face is complementary to a structure of the second end face, wherein a length of an outer contour of the first end face or the second end face is greater than a thickness b of the first compensation electrode or the second compensation electrode along a centerline direction OO' of the through via.

The first direction D1 and the second direction D2 are both perpendicular to the thickness direction of the encapsulation layer. Magnitude of an angle between the first direction D1 and the second direction D2 is not limited in the embodiments of the present disclosure, for example, the first direction D1 and the second direction D2 may be perpendicular to each other.

In this embodiment, the first sub-electrodes and the second sub-electrodes both have a grid structure, and materials of the first sub-electrodes and the second sub-electrodes are metal materials. Due to low resistance, good conductivity and high sensitivity of metal materials, transmission delays of electrical signals in the first sub-electrodes and the second sub-electrodes can be avoided, thus improving the touch effect. A shape of grid in the grid structure may be a regular polygon or an irregular polygon.

It may be seen from the above preparation process that in the touch display panel according to the embodiment of the present disclosure, the first compensation electrode and the second compensation electrode are disposed around the through via, and the structure of the first end face of the first compensation electrode is complementary to that of the second end face of the second compensation electrode, and the length of the outer contour of the first end face or the second end face is greater than the thickness of the first compensation electrode or the second compensation electrode along the centerline direction of the through via, so that the mutual induction area of the incomplete touch sensor is increased, the induction capacitance at the incomplete touch sensor is improved, and the uniformity of the touch performance of the entire active area is improved.

Figure 9:
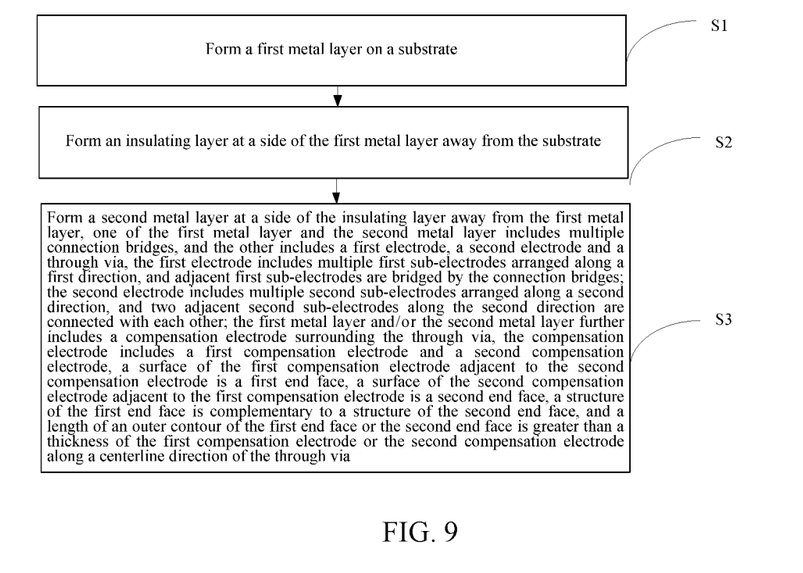
FIG. 9 is a schematic flowchart of a method for preparing a touch display panel according to an embodiment of the present disclosure.

An embodiment of the present disclosure further provides a method for preparing a touch display panel. As shown in FIG. 9, the method for preparing the touch display panel according to the embodiment of the present disclosure includes the following.

In S1, a first metal layer is formed on a substrate.

In S2, an insulating layer is formed at a side of the first metal layer away from the substrate.

In S3, a second metal layer is formed at a side of the insulating layer away from the first metal layer, one of the first metal layer and the second metal layer includes multiple connection bridges, and the other of the first metal layer and the second metal layer includes a first electrode, a second electrode and a through via, the first electrode includes multiple first sub-electrodes arranged along a first direction, wherein adjacent first sub-electrodes are bridged by the connection bridges; the second electrode includes multiple second sub-electrodes arranged along a second direction, wherein two adjacent second sub-electrodes along the second direction are connected with each other; at least one of the first metal layer and the second metal layer further includes a compensation electrode surrounding the through via, the compensation electrode includes a first compensation electrode and a second compensation electrode, a surface of the first compensation electrode adjacent to the second compensation electrode is a first end face, a surface of the second compensation electrode adjacent to the first compensation electrode is a second end face, a structure of the first end face is complementary to a structure of the second end face, and a length of an outer contour of the first end face or the second end face is greater than a thickness of the first compensation electrode or the second compensation electrode along a centerline direction of the through via.

In an exemplary embodiment, the first end surface or the second end surface may be a curved surface or a slope surface.

In an exemplary embodiment, the first compensation electrode and the second compensation electrode may be both disposed on the first metal layer, or may be both disposed on the second metal layer.

In an exemplary embodiment, the first end face includes one or more first protrusions and one or more first spacers, and the second end face includes one or more second protrusions and one or more second spacers, wherein the first protrusions are located in the second spacers and the second protrusions are located in the first spacers.

In another exemplary embodiment, one of the first compensation electrode and the second compensation electrode is disposed on the first metal layer and the other of the first compensation electrode and the second compensation electrode is disposed on the second metal layer.

In an exemplary embodiment, the first end face includes one or more first protrusions, and the second end face includes one or more second protrusions, wherein the first protrusions and the second protrusions are arranged at intervals.

In an exemplary embodiment, there is an overlap region between an orthographic projection of the first protrusions on the substrate and an orthographic projection of the second compensation electrode on the substrate. There is an overlap region between an orthographic projection of the second protrusions on the substrate and an orthographic projection of the first compensation electrode on the substrate.

In a case that the first compensation electrode and the second compensation electrode are disposed on different metal layers, an interval between the first end face and the second end face may be set to any small value, or there may be overlapping between the first end face and the second compensation electrode or between the first compensation electrode and the second end face, thus further increasing a mutual induction area between the first electrode and the second electrode, improving induction capacitance at an incomplete touch sensor and improving the uniformity of the touch performance of the entire active area.

In an exemplary embodiment, the first compensation electrode may include N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

In an exemplary embodiment, the second compensation electrode may include n second compensation sub-electrodes, wherein m second compensation sub-electrodes are connected with the second sub-electrodes, and (n−m) second compensation sub-electrodes are insulated from the first sub-electrodes and the second sub-electrodes, where m is a natural number smaller than or equal to n and n is a natural number greater than 1.

In an exemplary embodiment, centers of a circle where a circular arc of the first compensation electrode is located, a circle where a circular arc of the second compensation electrode is located and a circle where the through via is located may coincide with each other.

According to the preparation method of the touch display panel according to this embodiment, the first compensation electrode and the second compensation electrode are disposed around the through via, the structure of the first end face of the first compensation electrode is complementary to the structure of the second end face of the second compensation electrode, and the length of the outer contour of the first end face or the second end face is greater than the thickness of the first compensation electrode or the second compensation electrode along the centerline direction of the through via, so that the mutual induction area of the incomplete touch sensor is increased, the induction capacitance at the incomplete touch sensor is improved, and the uniformity of the touch performance of the entire active area is improved.

An embodiment of the present disclosure further provides a touch display apparatus which includes the touch display panel of the embodiment as described above. The touch display apparatus may be any product or component with a display function, such as a mobile phone, a tablet computer, a television, a display, a laptop computer, a digital photo frame, a navigator, etc.

In the description of embodiments of the present disclosure, orientation or positional relationships indicated by terms "middle", "upper", "lower", "front", "back", "vertical", "horizontal", "top", "bottom", "inside", "outside" and the like are based on the orientation or positional relationships shown in the drawings, and are for the purpose of ease of description of the present disclosure and simplification of the description only, but are not intended to indicate or imply that the mentioned apparatus or element must have a specific orientation, or be constructed and operated in a particular orientation, and therefore they should not be construed as limitation to the present disclosure.

In the description of embodiments of the present disclosure, unless otherwise explicitly specified and defined, the terms "install", "connect", "couple" should be understood in a broad sense, for example, a connection may be a fixed connection or a detachable connection, or an integrated connection; it may be a mechanical connection or an electrical connection; it may be a direct connection, or may be an indirect connection through an intermediary, or may be an internal connection between two elements. For those skilled in the art, the specific meanings of the above terms in the present disclosure may be understood according to actual situations.

Although the implementations of the present disclosure are disclosed above, the contents are only implementations used for ease of understanding of the present disclosure and not intended to limit the present disclosure. Those skilled in the art may make any modifications and variations to implementation forms and details without departing from the spirit and scope disclosed by the present disclosure. However, the scope of patent protection of the present disclosure should also be subject to the scope defined by the appended claims.

The invention claimed is:

1. A touch display panel comprising a substrate, a first metal layer disposed on the substrate, an insulating layer disposed at a side of the first metal layer away from the substrate, and a second metal layer disposed at a side of the insulating layer away from the first metal layer, wherein:

one of the first metal layer and the second metal layer comprises a plurality of connection bridges, and the other of the first metal layer and the second metal layer comprises a first electrode, a second electrode and a through via, the first electrode comprises a plurality of first sub-electrodes arranged along a first direction, and adjacent first sub-electrodes are bridged by a connection bridge; the second electrode comprises a plurality of second sub-electrodes arranged along a second direction, and two adjacent second sub-electrodes along the second direction are connected with each other; the through via penetrates through the first sub-electrodes and the second sub-electrodes; and at least one of the first metal layer and the second metal layer further comprises a compensation electrode surrounding the through via, wherein the compensation electrode comprises a first compensation electrode and a second compensation electrode; a surface of the first compensation electrode adjacent to the second compensation electrode is a first end surface; a surface of the second compensation electrode adjacent to the first compensation electrode is a second end surface; a structure of the first end surface is complementary to a structure of the second end surface; and a length of an outer contour of the first end surface is greater than a thickness of the first compensation electrode along a centerline direction of the through via;

wherein the first end surface comprises one or more first protrusions, and the second end surface comprises one or more second protrusions, and the one or more first protrusions and the one or more second protrusions are arranged at intervals;

wherein there is an overlap region between an orthographic projection of the one or more first protrusions of the first end surface of the first compensation electrode on the substrate and an orthographic projection of the second compensation electrode on the substrate, and there is an overlap region between an orthographic projection of the one or more second protrusions of the second end surface of the second compensation electrode on the substrate and an orthographic projection of the first compensation electrode on the substrate.

2. The touch display panel according to claim 1, wherein at least one of the first compensation electrode and the second compensation electrode is electrically connected with one of the first sub-electrodes or one of the second sub-electrodes.

3. The touch display panel according to claim 2, wherein the first compensation electrode comprises N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

4. The touch display panel according to claim 1, wherein arrangement positions of the first compensation electrode and the second compensation electrode comprises at least one of:
the first compensation electrode and the second compensation electrode are both disposed on the first metal layer;
the first compensation electrode and the second compensation electrode are both disposed on the second metal layer; and
one of the first compensation electrode and the second compensation electrode is disposed on the first metal layer, and the other of the first compensation electrode and the second compensation electrode is disposed on the second metal layer.

5. The touch display panel according to claim 4, wherein the first compensation electrode comprises N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

6. The touch display panel according to claim 1, wherein the first end surface and the second end surface are curved surfaces or slope surfaces.

7. The touch display panel according to claim 6, wherein the first end surface comprises one or more first spacers, and the second end surface comprises one or more second spacers, and the one or more first protrusions are located in the one or more second spacers and the one or more second protrusions are located in the one or more first spacers.

8. The touch display panel according to claim 1, wherein the first compensation electrode comprises N first compensation sub-electrodes, wherein M first compensation sub-electrodes are connected with the first sub-electrodes, and (N−M) first compensation sub-electrodes are insulated from the first sub-electrodes and the second sub-electrodes, where M is a natural number smaller than or equal to N and N is a natural number greater than 1.

9. The touch display panel according to claim 1, wherein the second compensation electrode comprises n second compensation sub-electrodes, wherein m second compensation sub-electrodes are connected with the second sub-electrodes, and (n−m) second compensation sub-electrodes are insulated from the first sub-electrodes and the second sub-electrodes, where m is a natural number smaller than or equal to n and n is a natural number greater than 1.

10. The touch display panel according to claim 1, wherein a shape of the first compensation electrode is a circular arc structure, a shape of the second compensation electrode is a circular arc structure, and a center of a circle where the circular arc of the first compensation electrode is located, a center of a circle where the circular arc of the second compensation electrode is located, and a center of a circle where the through via is located coincide with each other.

11. The touch display panel according to claim 10, wherein a diameter of the circle where the circular arc of the first compensation electrode is located is equal to a diameter of the circle where the circular arc of the second compensation electrode is located.

12. A touch display apparatus, comprising the touch display panel according to claim 1.

13. A method for preparation a touch display panel, comprising:
forming a first metal layer on a substrate;
forming an insulating layer at a side of the first metal layer away from the substrate;
forming a second metal layer at a side of the insulating layer away from the first metal layer, wherein one of the first metal layer and the second metal layer comprises a plurality of connection bridges, and the other of the first metal layer and the second metal layer comprises a first electrode, a second electrode and a through via, the first electrode comprises a plurality of first sub-electrodes arranged along a first direction, and adjacent first sub-electrodes are bridged by a connection bridge; the second electrode comprises a plurality of second sub-electrodes arranged along a second direction, and two adjacent second sub-electrodes along the second direction are connected with each other; at least one of the first metal layer and the second metal layer further comprises a compensation electrode surrounding the through via, the compensation electrode comprises a first compensation electrode and a second compensation electrode; a surface of the first compensation electrode adjacent to the second compensation electrode is a first end surface; a surface of the second compensation electrode adjacent to the first compensation electrode is a second end surface; a structure of the first end surface is complementary to a structure of the second end surface; and a length of an outer contour of the first end surface is greater than a thickness of the first compensation electrode along a centerline direction of the through via;
wherein the first end surface comprises one or more first protrusions, and the second end surface comprises one or more second protrusions, and the one or more first protrusions and the one or more second protrusions are arranged at intervals;
wherein there is an overlap region between an orthographic projection of the one or more first protrusions of the first end surface of the first compensation electrode on the substrate and an orthographic projection of the second compensation electrode on the substrate, and there is an overlap region between an orthographic projection of the one or more second protrusions of the second end surface of the second compensation electrode on the substrate and an orthographic projection of the first compensation electrode on the substrate.

14. The method according to claim 13, wherein arrangement positions of the first compensation electrode and the second compensation electrode comprises any one of:

the first compensation electrode and the second compensation electrode are both disposed on the first metal layer;

the first compensation electrode and the second compensation electrode are both disposed on the second metal layer; and one of the first compensation electrode and the second compensation electrode is disposed on the first metal layer, and the other of the first compensation electrode and the second compensation electrode is disposed on the second metal layer.

15. The method according to claim 13, wherein the first end surface and the second end surface are curved surfaces or slope surfaces.

16. The method according to claim 15, wherein the first end surface comprises one or more first spacers, and the second end surface comprises one or more second spacers, wherein the one or more first protrusions are located in the one or more second spacers and the one or more second protrusions are located in the one or more first spacers.

* * * * *